(12) United States Patent
Kellner

(10) Patent No.: US 8,664,502 B2
(45) Date of Patent: Mar. 4, 2014

(54) SYSTEM AND METHOD FOR MUSICAL EDUCATION

(76) Inventor: Robert L. Kellner, Seattle, WA (US)

( * ) Notice: Subject to any disclaimer, the term of this patent is extended or adjusted under 35 U.S.C. 154(b) by 31 days.

(21) Appl. No.: 13/465,013

(22) Filed: May 6, 2012

(65) Prior Publication Data

US 2012/0285314 A1 Nov. 15, 2012

Related U.S. Application Data

(60) Provisional application No. 61/485,254, filed on May 12, 2011.

(51) Int. Cl.
*G09B 15/00* (2006.01)

(52) U.S. Cl.
USPC ...................................... 84/477 R; 84/485 R

(58) Field of Classification Search
USPC ....................................................... 84/477 R
See application file for complete search history.

(56) References Cited

U.S. PATENT DOCUMENTS

| | | | | | |
|---|---|---|---|---|---|
| 494,698 | A | * | 4/1893 | Zorger | 84/314 R |
| 656,917 | A | * | 8/1900 | Wight | 84/314 R |
| 1,991,864 | A | * | 2/1935 | Nopola et al. | 84/477 R |
| 3,403,590 | A | * | 10/1968 | Bernard | 84/470 R |
| 3,748,947 | A | * | 7/1973 | Freiheit | 84/485 R |
| 5,373,768 | A | * | 12/1994 | Sciortino | 84/293 |
| 5,458,040 | A | * | 10/1995 | Lawrence, Jr. | 84/473 |
| 7,767,894 | B1 | * | 8/2010 | Diakoulas | 84/477 R |
| 8,399,756 | B1 | * | 3/2013 | Trent et al. | 84/485 R |
| 2009/0266223 | A1 | * | 10/2009 | Tashima | 84/485 R |
| 2012/0285314 | A1 | * | 11/2012 | Kellner | 84/485 R |

* cited by examiner

*Primary Examiner* — Robert W Horn
(74) *Attorney, Agent, or Firm* — Patrick M Dwyer

(57) ABSTRACT

A method of locating, discovering, and memorizing the names of the notes for acoustic and electric stringed musical instruments is disclosed. The method includes joining the frontal view of the fingerboard of the instrument with a labeled virtual view of the fingerboard applied to the back of the instrument neck in a location corresponding to respective frets on the front.

1 Claim, 7 Drawing Sheets

SYSTEM AND METHOD FOR MUSICAL EDUCATION

This application claims priority to U.S. Provisional Patent application Ser. No. 61/485,254 filed May 12, 2011.

TECHNICAL FIELD

This application relates to musical education; more particularly it relates to instructional methods for playing a variety of instruments, including fretted and unfretted stringed instruments, and keyboard instruments such as pianos, organs, & portable keyboards.

BACKGROUND OF THE INVENTION

Books, chord charts & DVD's abound to explain and teach music theory through various pedagogical methods. Despite the availability of these aids, a number of homemade methods are still used to learn the names of the notes DIRECTLY on the instrument. Guitar players will remove the strings and use nail polish, white out, or colored marking pens to carefully write the names of each note on the fretboard directly underneath the strings. Piano students as well as classical guitar students will use sticky stars to mark divisions on the keyboard or fretboard and memorize the location of middle 'C'. Even student violinists are known to apply thin strips of different colored electrical tape to mark off where certain notes are located.

Although there are many audio and visual learning aids in existence, they are not providing a means applied to the instrument improving upon traditional methods for learning the name and location of each note on an instrument.

DISCLOSURE OF THE INVENTION

Summary

The disclosed methods serve to help a player understand the fretboard. And an understanding of the fretboard makes a player functional in music. Once one becomes functional on a given instrument, confidence soars.

Part of what is disclosed are novel methods and tools for locating, discovering, and memorizing the names of the notes on an instrument. Some embodiments of these tools are decals that are applied to the neck and/or body of a fretted instrument or onto the individual keys of a keyboard.

A method of locating, discovering, and memorizing the names of the notes for acoustic and electric stringed musical instruments is disclosed. With some modification, the method can be adapted for acoustic, electric, and digital musical keyboards. In the disclosed method, the available musical notes for a particular instrument are generally symmetrically rearranged and printed on custom sized shapes of vinyl substrate (or the like substrate with auto-cling properties).

The decals are first applied in location specific areas on the back of the neck of a stringed musical instrument, or directly on or over the keys of a keyboard instrument. The decals are a reusable and may be applied to the same or different instruments of the same general type and musical scaling. The disclosed method accommodates all scale lengths used in electric and acoustic stringed instrument construction.

In general the disclosed process may be thought of as an interface between player and instrument. This new method induces players to locate, discover, and memorize where and what the names of the musical notes are on their instrument by joining the frontal view of the fingerboard of the instrument with the new labeled or 'virtual' view of the fingerboard when applied to the back of the instrument neck in the correct locations. That is, the player is viewing the locations of the notes symmetrically, as though the player were staring through the back of the neck and at the fingerboard of the instrument, thus eliminating any need to turn and look directly at the fingerboard.

Advantageously each decal set is a separate embodiment of the disclosed system and each one uniquely constructed to fit one of the scale lengths used for each instrument in each of following families of instruments and their varying shapes and sizes: Guitar, Banjo, Ukulele, and Piano.

The placement of disclosed decals on the back of the neck of the instrument is generally location specific. Looking at the back of the neck to reference notes creates a new posture for the player to take advantage of This new posture is novel in the field of playing and instructing playing for disclosed instruments. In the absence of the disclosed method and tools, there would be no reason to look at the back of the neck of an instrument. A new player would have to see and learn the names of the musical notes in the traditional manner, and the musical notes could only be accessed and played on the front of the instrument, where in essence they are thought of as 'located'. The back of the neck otherwise is only for bracing a player's hand while playing and holding the instrument.

A method is disclosed for inducing players change to a new visual posture to locate, discover, and memorize where and what the names of the musical notes are on an instrument, placing a new virtual view of the front of the fretboard onto the back of the neck, and eliminating the traditional need to turn and stare directly at the fretboard to learn note placement.

It is a method of creating, applying and teaching music with learning decals on the back of a guitar neck (or like stringed instrument—and with some modifications, to the keyboard of a keyboard instrument including accordions and the like). Using an instrument's scale length to figure out how to design a decal similar to those disclosed herein and which is adapted or configure to be applied to the back of a neck is intended to be included in the scope of the claims, even if that design does not otherwise resemble what is here disclosed or illustrated (such as the illustrations here that show the fretboard divided into 4 separate decals that represent the open strings to the 12th fret).

While it's possible to put the decals anywhere on the body of the instrument (i.e. to use as a learning tool), if the decal (s) represents a virtual view of the notes of the fingerboard looking through the back of neck then it is intended to be within the scope of the claims.

The orientation/organization of the notes is also a unique design since the arrangement of the notes in these specific rows and columns is based on the instrument's scale length, but not obvious. Because of the symmetrical arrangement of the notes, if one attempted to put the decal (for example) for frets 1-4 on the front of the fretboard the notes would read inverted —1st fret note column would be in 4th fret location.

This is the first time static cling, ultra cling, and or phototex (brand names) substrates are being employed in a reusable and repositionable manner with printed specific scale length based graphic designs meant specifically for locations on the back of a stringed musical instrument's neck. Of course in addition to brand name substrates cal led out above, other non-adhesive or low tack adhesive substrates may also be employed. Use of the System in methods of instruction for playing an instrument This is a note identification system and/or note location system. The disclosed system serves as a support system for all existing styles & methods that ask a player to locate notes in order for that particular method to work. Embodiments for playing a variety of instruments, including fretted and unfretted stringed instruments as well as keyboard instruments (pianos, organs, portable keyboards) serve to support all existing styles and methods for those instruments by same or similar means as well. The following styles and methods (example, guitar) are supported (not intended as exclusive list): Classical, Jazz. Blues, Rock, Flamenco, Country, Funk, Ragtime, Fingerstyle, C-A-G-E-D Method, Berklee Press Modern Guitar Method, Mel Bay Method, Hal Leonard Method, Mickey Baker Method and Basic Guitar Method.

"It is not as hard once familiar" is a common sentiment music students express to their music teachers. Sometimes it is not that a tune or a musical concept is beyond a students ability. Instead it is a new or unfamiliar situation. Newcomers have the skills, but must put in the time with the memory work (muscle memory & mental/comprehensive memory). The disclosed system helps them become more familiar with their instrument so that learning new tunes and musical concepts are not frustrating.

One or all of the decals can be applied at the users discretion, enabling a player to achieve the following by improved means:

Assisting in learning to play within a musical position by visually allowing the player to focus on only one position, or particular location of notes on the fretboard.

Eliminating for the new player the habit of knowing which finger is producing which note of a chord by visualizing, counting up half-step intervals from the open strings to the notes being fretted.

What do you want to learn? Chords, scales, melodies, accompanimental patterns, songs & tunes by favorite artist and music theory are all within your grasp.

The following exercises are provided by way of example in aiding instruction:

Octaves: Learn your octaves by staying in one fixed position, or a particular location of the hand on the fretboard. Start with all the C notes. Using the decals: see, remember, and learn where the C notes are on the fretboard. Move on to learning all the C sharp notes. Then the D notes etc.

Scale Patterns & Intervals: Learning scale patterns & intervals. Knowing each fret/note name is one half-step from the next fret, one can count the half-steps which represent the smallest intervals between two notes in the western musical alphabet. One can count intervals to figure out different types of scales. A student may be asked to write out their major, minor, chromatic, pentatonic, blues scales (and the like) using the decals as a guide.

Ear Training: 1) Pick a note and play it. 2) use your ear and/or count the intervals using the decals 3) Using the note you picked as a starting point or write out a scale of your choosing using the decals. 4) Play and listen to the notes.

Melodic Development: Play a scale or simple melody on one string only. Then figure out the same scale or melody within one fixed position; in other words, in a particular location of the hand on the fretboard. Refer to the decals to help you remember the names of that group of notes. Notice how the note arrangement differs from horizontal or vertical positions across the fretboard even though the scales or melodies sound the same.

Students with a less developed ear can use the decals to figure out where the bass note of a chord is located. This aids in developing aural skills primarily in new musicians or in people new to written music and music theory.

Improvisation

The disclosure is also generally an aid to the art of introducing improvised musical details into written composition. For example, and not by way of limitation, potential uses for improvisers are as follows: transcription tool for musical arrangement, helpful guide for transposing music into different keys, helpful guide for modulations within a piece of music, quick reference when improvising for later retrieval.

As further example, a musician creates a nifty guitar lick. Using the decals she can quickly see what notes she played and then capture the notation details.

BEST MODE

Figure 1:
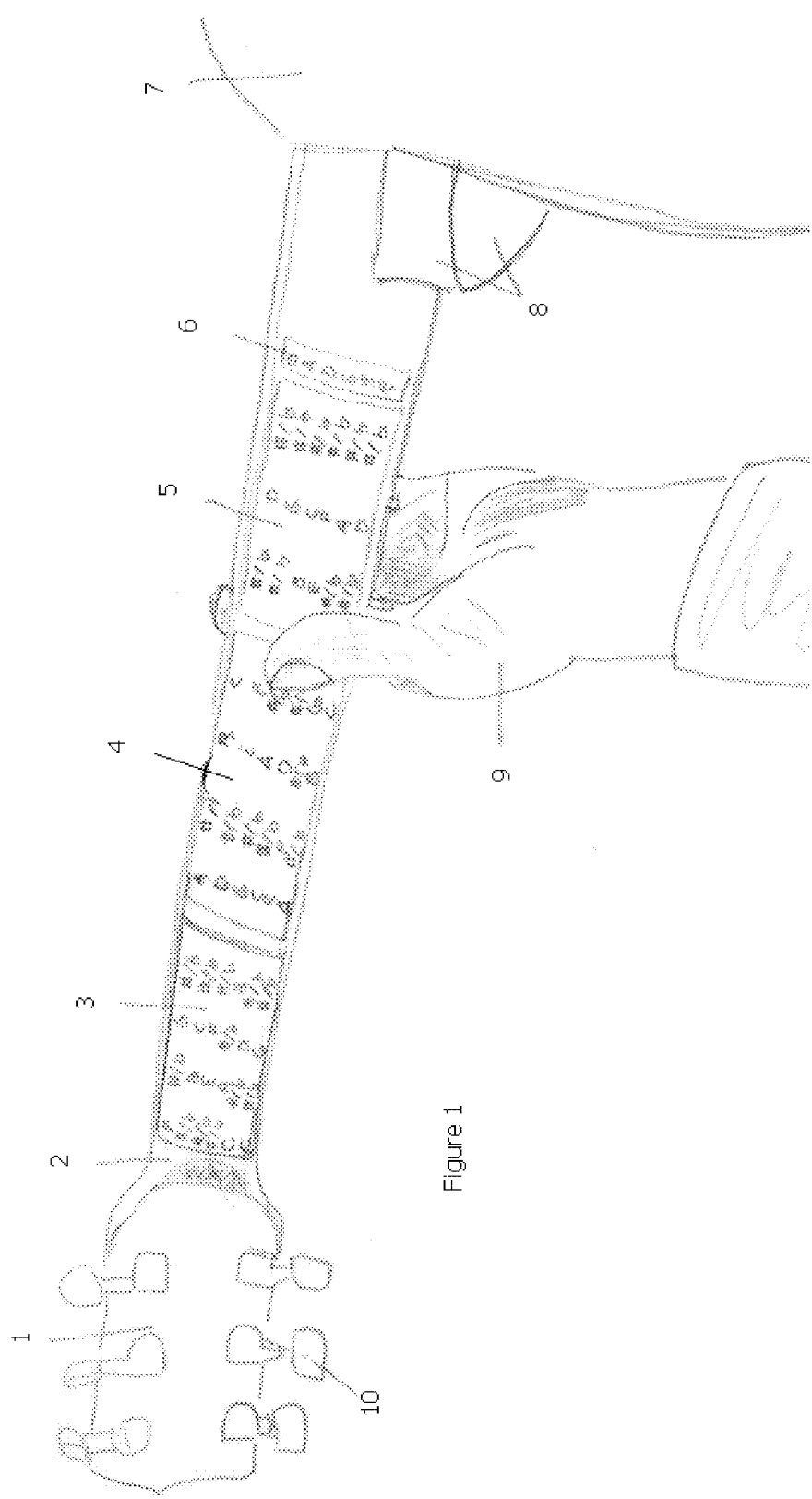
FIG. 1 is a schematic elevational view of an embodiment of the system.

FIG. 1 is a schematic perspective from the back of the guitar neck while player is in playing position, with decals applied. Headstock 1 and neck 2 of guitar are shown in rear perspective. Decals 3-6 represent Frets #1-4, Frets #5-8, Frets #9-11 and Fret #12, respectively. Body or soundbox 7 of guitar is shown in rear perspective, and heel block 8 of guitar is shown from the base of neck 2 as an external rear perspective and joins neck 2 to soundbox 7 of guitar. Player's fretting hand 9 is shown in playing position, thumb bracing back of neck in order to support fingers on the strings, thumb or palm of fretting hand generally in contact with the decals. Tuning machines 10 mounted on back of headstock are for tuning strings.

The type of decal substrate best employed (static or ultra cling) depends upon the type of finish on the back of the neck. Urethane, nitrocellulose, or French Polish (shellac) finishes work with either static or ultra cling. Satin (oil) finished necks generally do better with ultra cling decals.

Figure 2:
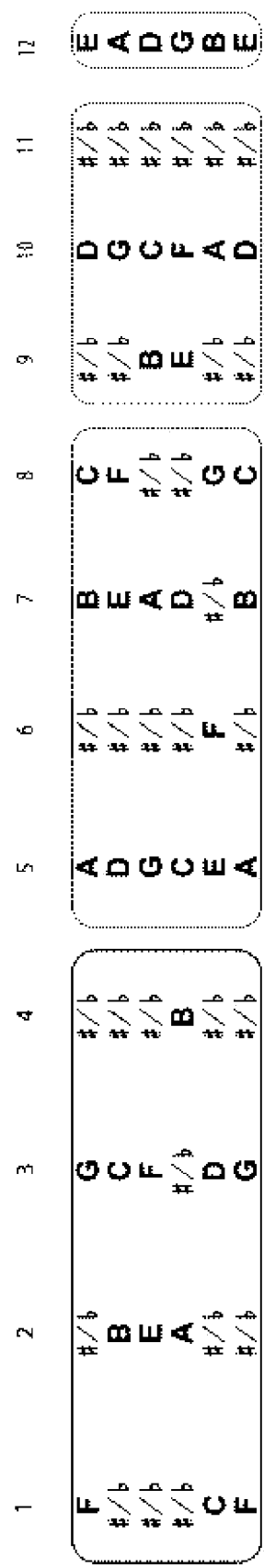
FIG. 2 is a schematic layout of a typical template for the decal aspect of the system.
Figure 3:
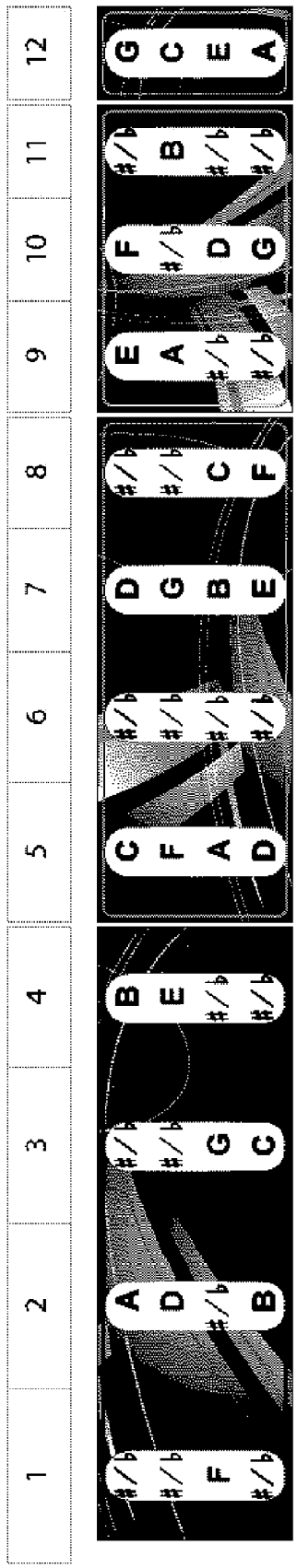
FIGS. 3-7 are sample black and white images of decal sets.
Figure 4:
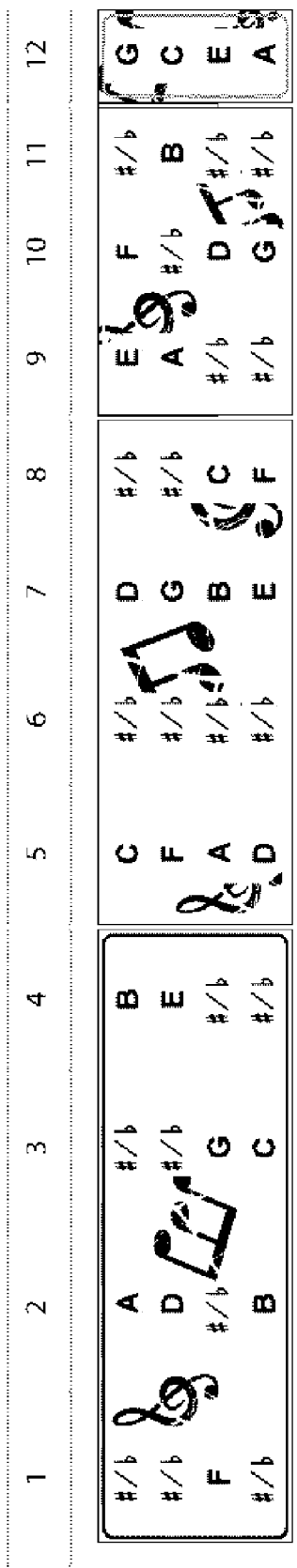
Figure 5:
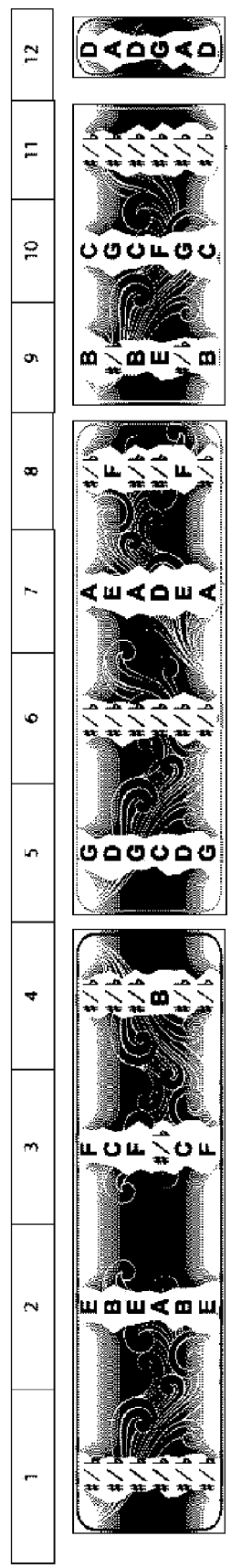
Figure 6:
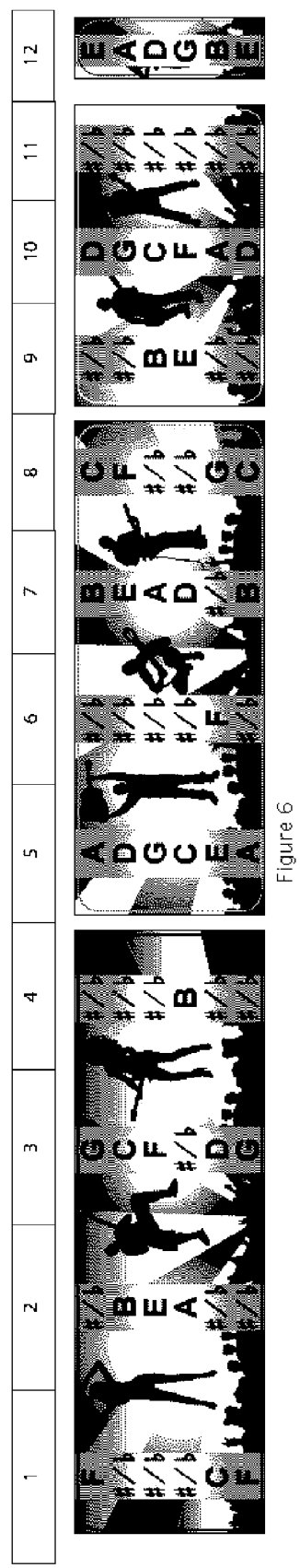
Figure 7:

In general, each decal corresponds to the series of frets for which it is specifically designed. For example, referring also to FIG. 2, Decal #1 contains all the notes and their accidentals (sharp and flat notes represented by the #/b symbols) for frets #1-4 where #=sharp and b=flat. For example, guitars (in standard tuning only) have low to high strings reading from top to bottom E-A-D-G-B-E.

For further example, the names of the strings strummed open (ieno strings fretted) from low to high in standard tuning are E-A-D-G-B-E. When the A string is held down at the third fret, the player can see on Decal #1, reading from left to right, that the note "C" is indicated in this position, ie 3 notes over from the top row and one down.

To read the accidentals or enharmonic notes the player references the note name that comes before or after the #/b symbol. For example, using the "C" note discussed above, when the player frets the next note after the C by moving up the same string by one fret the #/b symbol serves to tell the player that the next note is either a C sharp or a D flat (referring down one fret from the "D" note on the 5th fret of the A string). In this embodiment the D note on the 5th fret will be on Decal #2 which represents Frets #5-8.

One or all the decals can be applied at the players discretion. When all the decals are applied all the notes from Frets 1-12 are represented. This comprises a full octave of all the notes found on the guitar. The notes of the twelfth fret are the same as the notes of the open strings (E-A-D-G-B-E).

Disclosed educational/instructional material aids for fretted instruments used in the disclosed system are made in the following manner:

Determine the type of instrument and the scale length of said instrument;

Using a fret calculator determine the spacing of the frets from the nut or 'zero' fret to the highest number fret on the instrument;

The decals are then printed on static cling and/or ultra cling vinyl substrate (or the like) using either digital or silkscreen printers and plot cutters in any sizes and dimensions as to fit the profile of the neck, heel, and/or body of the instrument. Also as part of the manufacturing process the photo-tex face is desireably coated after printing with an aqueous sealer to increase the durability of the decals from rub out from players hands. This is believed to be useful because photo-tex is a fabric based substrate, and are instances of potential ink bleed out of the substrate without the coating.

Each decal desirably has foreground and background printing on the printable face of the substrate. The foreground printing desirably contains the alphabetic symbols of musical note names and their accidentals (sharp and flat notes) in their fixed locations. Each decal preferably has a unique single line border offset from the edges of the decal (typical offset=1/32"). The unique color of each border serves to instruct a player where to apply the decals on the back of the neck. The background may or may not contain any artwork or effect such as glitter. The background may be clear or may be any combinations of colors provided it does not obscure or prevent a user from being able to see the names of the musical notes and their accidentals in the foreground. The numbered boxes above the decals are only for reference as to identify which fret a column represents.

A commercial "set" of decals may include any number of decals as long as the decals for the particular instrument's scale length sequentially represent a complete listing of all the notes on the instrument from the zero fret to the highest.

For example, in guitars with a 25.4" scale length, a set will have four separate decals: decal 1 identified optionally by a red border (Frets 1-4), decal 2 identified optionally by a green border (Frets 5-8), decal 3 identified optionally by a blue border (Frets 9-11), decal 4 identified optionally by a orange border (Fret 12 or the 'zero' fret behind the nut).

Static cling decals are desirably 8 mm thick and ultra cling decals are 6 mm thick. Other values and dimensions may be employed as well. Dimensions for one embodiment are set out in Table 1:

| $4^{29}/_{32}$" × $1^{9}/_{16}$" | $4^{1}/_{32}$" × $1^{9}/_{16}$" | $2^{7}/_{16}$" × $1^{9}/_{16}$" | $1/2$" × $1^{9}/_{16}$" |
|---|---|---|---|
| Decal 1 Red Color Ring | Decal 2 Green Color Ring | Decal 3 Blue Color Ring | Decal 4 Orange Color Ring |

FIGS. 3-7 are sample black and white images of decal sets. They can be printed on any substrate. A desirably finished product includes 4 (separate) decals to be sold as one complete set.

A preferred packaging substrate is made from recycled plastic & paper coated in water based aqueous sealer, and doubles as a reusable repositionable storage backing, for when decals are not on instrument. This helps prevent sending the packaging to the landfill.

With regard to systems and components above referred to, but not otherwise specified or described in detail herein, the workings and specifications of such systems and components and the manner in which they may be made or assembled or used, both cooperatively with each other and with the other elements of the invention described herein to effect the purposes herein disclosed, are all believed to be well within the knowledge of those skilled in the art. No concerted attempt to repeat here what is generally known to the artisan has therefore been made.

In compliance with the statute, the invention has been described in language more or less specific as to structural features. It is to be understood, however, that the invention is not limited to the specific features shown, since the means and construction shown comprise preferred forms of putting the invention into effect. The invention is, therefore, claimed in any of its forms or modifications within the legitimate and valid scope of the appended claims, appropriately interpreted in accordance with the doctrine of equivalents.

I claim:

1. A method of locating, discovering, and memorizing the names of the notes for acoustic and electric stringed musical instruments, the method comprising:
   joining the frontal view of the fingerboard of the instrument with a labeled virtual view of the fingerboard applied to the back of the instrument neck in a location corresponding to respective frets on the front.

\* \* \* \* \*